United States Patent [19]

Thompson et al.

[11] 4,251,986
[45] Feb. 24, 1981

[54] SEAL VIBRATION-REDUCING APPARATUS

[75] Inventors: James L. Thompson, Union Township, Cincinnati County; Ambrose A. Hauser, Wyoming; Mark S. Zlatic, West Chester; John C. Lake, Hamilton, all of Ohio

[73] Assignee: General Electric Company, Cincinnati, Ohio

[21] Appl. No.: 966,719

[22] Filed: Dec. 5, 1978

[51] Int. Cl.² ............................................. F02C 7/20
[52] U.S. Cl. ................................. 60/39.32; 60/39.36
[58] Field of Search ............... 60/39.32, 39.65, 39.69, 60/39.36; 285/224, 165

[56] References Cited

U.S. PATENT DOCUMENTS

| | | | |
|---|---|---|---|
| 2,795,108 | 6/1957 | Saldin | 60/39.69 X |
| 2,876,622 | 3/1959 | Mackay | 60/39.32 X |
| 3,042,364 | 7/1962 | Rowe . | |
| 3,062,499 | 11/1962 | Peterson . | |
| 3,144,255 | 8/1964 | Thorne et al. . | |
| 3,154,311 | 10/1964 | Gustafson . | |
| 3,376,017 | 4/1968 | Rizk et al. . | |
| 3,463,498 | 8/1969 | Bill . | |
| 3,576,328 | 4/1971 | Vose . | |
| 3,609,968 | 10/1971 | Mierley et al. . | |
| 3,965,066 | 6/1976 | Sterman et al. | 60/39.32 |
| 4,016,718 | 4/1977 | Lauck . | |

FOREIGN PATENT DOCUMENTS 496626 10/1950 Belgium .................................. 60/39.32

Primary Examiner—Carlton R. Croyle
Assistant Examiner—Edward Look
Attorney, Agent, or Firm—Donald W. Walk; Derek P. Lawrence

[57] ABSTRACT

An apparatus is provided in a gas turbine engine for eliminating air leakage-induced vibration at natural frequencies in a type of flexible annular seal structure sometimes referred to as a floating fishmouth seal. A floating fishmouth seal has male and female sections arranged to permit axial and radial movement and still maintain a sealing relationship. In a preferred form, the apparatus for eliminating air leakage-induced vibration includes two structures that interact with the male and female sections of the fishmouth seal during engine operation. The first structure is an annular leaf spring assembly that presses a radial flange of the male section of the seal against a stationary wall to obtain frictional damping. The second structure is an annular member attached to an outer surface of the female section of the seal forming a closed-in structure to provide stability and damping. The combined effect of the two structures is to increase the operational life of the fishmouth seal.

7 Claims, 3 Drawing Figures

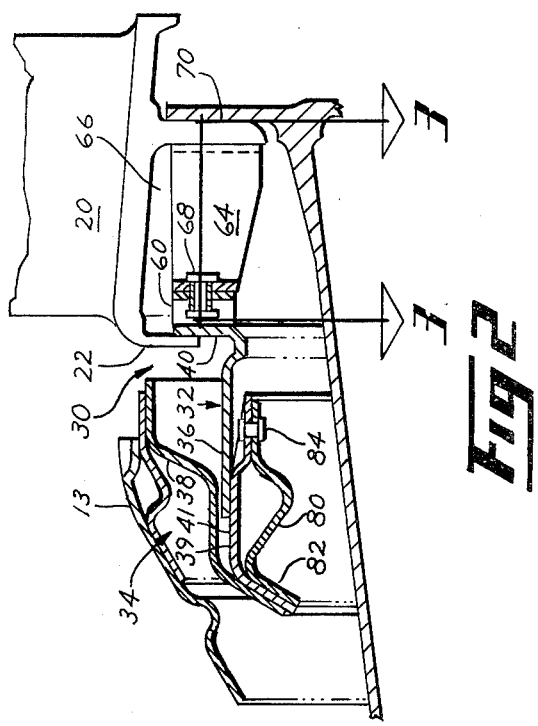
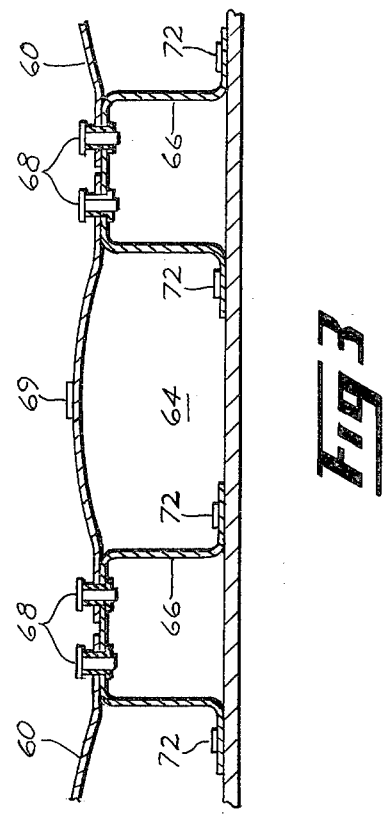
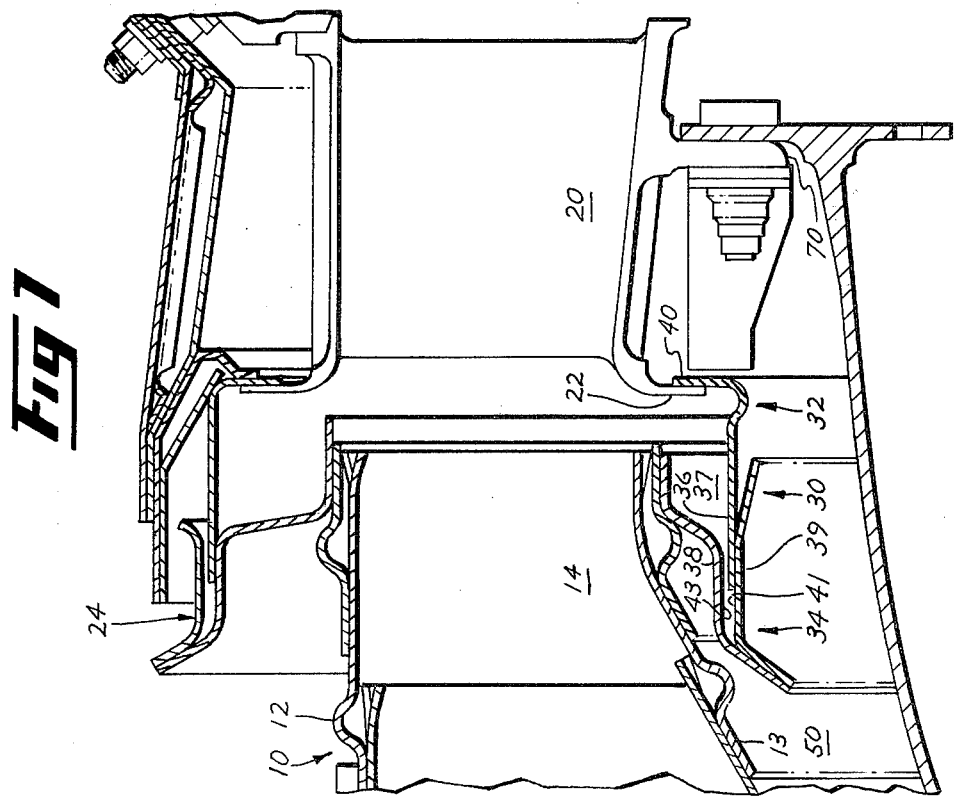

SEAL VIBRATION-REDUCING APPARATUS

BACKGROUND OF THE INVENTION

1. Field of the Invention

This invention relates to vibration-reducing means employed in conjunction with flexible annular seal structures in gas turbine engines.

2. Description of the Prior Art

In modern gas turbine engines, major components of the engine are designed to be assembled and disassembled in modules. During engine operation, these modules expand and contract both axially and radially because of temperature differences in different sections of the engine. The means of attachment between these modules must be flexible and capable of dimensionally absorbing this expansion and contraction. In addition, at some points of attachment, these modules define boundaries between coannular fluid flowpaths that are pressurized to different levels. To prevent leakage between these fluid flowpaths, the means of attachment must maintain an effective sealing relationship between modules and must also dimensionally absorb expansion and contraction.

A particular type of seal structure that accomplishes these functions and has been successfully employed as an attachment means between modules in gas turbine engines is known as a "floating fishmouth seal." Floating fishmouth seals are comprised of two sections, a male section and a female section. The male section is an annulus that extends into an annular inlet in the female section. The female section is generally comprised of two annular arms that are joined together at one end and diverge at the other end thereby forming the annular inlet. The floating fishmouth seal will accommodate expansion and contraction in both the radial and axial directions, because the male section can move both radially and axially within the annular inlet in the female section and still maintain a sealing contact. This floating fishmouth seal construction has been successfully employed at various locations in gas turbine engines, and the fishmouth seal structure is generally well known to those skilled in the art.

While the capability of a fishmouth seal to absorb dimensional variations is very desirable in gas turbine engine applications, the relative movement of the male and female sections of the fishmouth seal tends to encourage vibration within the sealing structure. Any propensity to vibrate can be exaggerated under the extreme pressure and high rotational velocities incurred during gas turbine gas operation. These conditions can be particularly troublesome in flexible sealing structures in which there are widely temperature differences and in which large dimensional variations are present. Additionally, the sealing structure must prevent gas leakage between regions of widely varying pressure. In particular, it is necessary that the sealing structure provide an effective seal between the relatively low pressure gas flowpath products and the relatively high pressure cooling air flowing through a surrounding cooling plenum. The large pressure differences between these two gas flows often cause the seal to become self-excited by air leakage across the sealing structure. This self-excitation is referred to by those skilled in the art as aeroelastic instability. A condition of aeroelastic instability often leads to excessive and uncontrolled vibration.

Uncontrolled vibration at this location can lead to rapid fatigue failure or cracking of the combustor or turbine members or the sections of the seal structure itself. Failure in the sealing structure can result in small pieces of the seal being blown into the gas flowpath of the engine causing excessive damage to downstream parts. Therefore, means for preventing excessive vibration in the sealing structure are necessary to maintain successful engine operation.

SUMMARY OF THE INVENTION

It is, therefore, an object of the present invention to provide a structure that eliminates air leakage-induced vibration and reduces vibration caused by rotational loads in a particular type of flexible annular seal structure referred to as a floating fishmouth seal. To accomplish this objective, the subject invention is comprised of a vibration-reducing structure, referred to as a first structure. The first structure reduces vibration by providing dry coulomb damping to the seal. In a preferred form, the first structure cooperates with a second structure which reduces vibration by providing torsional rigidity, radial stiffness, and damping.

The first structure is an annular assembly of a plurality of curved leaf springs that press a floating male section of the fishmouth seal against a stationary lip within the engine. The frictional engagement between the male section of the fishmouth seal, the curved leaf springs, and the stationary lip, creates an effect known as dry coulomb damping that reduces vibration.

The second structure is an annular sinusoidal-shaped member that is secured at each end to an outer surface of a female section of the fishmouth seal to provide a closed-in structure to increase torsional rigidity. Increasing the torsional rigidity of this lower arm stabilizes the female section of the seal structure and reduces the tendency of the seal to vibrate. The combined effect of the two vibration-reducing structures on a fishmouth seal causes a reduction of vibratory stresses and extends the operational life of the seal.

DESCRIPTION OF THE DRAWINGS

The present invention will become more clearly understood by reference to the appended specification in conjunction with the drawings wherein:

FIG. 1 depicts a cross-sectional view of a typical flexible annular seal between a combustor and a turbine stator of a gas turbine engine;

FIG. 2 depicts a cross-sectional view of the flexible annular seal shown in FIG. 1 as modified by the present invention;

FIG. 3 depicts a cross-sectional view of a portion of a spring support structure of the present invention taken along line 3—3 of FIG. 2.

Referring now to FIG. 1, an interior portion of a gas turbine engine is shown wherein one embodiment of the current invention may be usefully employed. This figure shows an aft end portion of a combustor 10 of an aircraft engine, including an outer combustor liner 12, an inner combustor liner 13, and a combustor outlet 14. The combustor outlet 14 directs a flowpath of products of combustion from the combustor 10 into a first stage vane 20 of an inlet nozzle in a turbine section of the engine. The combustor section 10 must be connected to the turbine section with sealing structures that can absorb changes in position of the combustor and turbine sections during operation and simultaneously prevent leakage across the seal into the flowpath of the products of combustion. Two annular sealing structures are provided for this purpose and are shown as seal 24 and seal 30 in FIG. 1.

For the purpose of simplifying this description, the location and function of the combustor section, the turbine section, and the sealing structure 30 linking these two sections are omitted from the figures and the description. This information is fully set forth in U.S. Pat. No. 3,965,066—Sterman, et al., assigned to the same assignee as the present invention, the disclosure of which is incorporated herein by reference because the patent fully describes the location and function of the sealing structures linking the combustor section to the turbine section. This Sterman, et al., patent also describes the hostile environment within which the sealing structures must operate and the problems unique to this region within the engine. Such hostile environment exists, during engine operation, in that region shown in FIG. 1. As described in the Sterman, et al., patent, seal structure 24 and 30 must prevent relatively high pressure cooling air from leaking into the relatively low pressure region between the combustor outlet 14 and the first stage vane 20. In the region surrounding seal 30, cooling air that has been fully compressed by the compressor section flows through cooling air duct 50 and continues aft in the engine to cool the hot turbine parts. Seal 30 must prevent leakage of cooling air from duct 50 into the flowpath of the products of combustion and must simultaneously absorb dimensional changes of the combustor section in relation to the turbine section during operation.

To accomplish these functions, a special type of flexible annular seal, sometimes referred to by those skilled in the art as a "floating fishmouth seal," is employed. The floating fishmouth seal 30, shown in FIGS. 1 and 2, has two major sections: a male section 32, comprised of an annular extension 36 and radial flange 40; and a female section 34, comprised of upper arm 38 and lower arm 39 joined together at one end to define annular inlet 37. To form a sealing structure, annular extension 36 of the male section 32 is inserted or fitted into annular inlet 37 formed by upper arm 38 and lower arm 39 of the female section 34. The annular extension 36 presses against, but is not secured to either upper inner surface 43 of arm 38 or lower inner surface 41 of arm 39 thereby forming a sealing relationship.

In the floating fishmouth seal the male section is not fixed to any structure and it is, therefore, free to "float" radially within a strictly confined region. During engine operation, the male section moves to physically absorb relative changes in dimension and position of the structures forming the boundaries of the sealing relationship. As shown in FIG. 1, the annular extension 36 of the male section 32 presses against inner surfaces 41 or 43 of the female section 34, thereby forming one end of the sealing relationship. The opposite end of the male section 32 includes a radial flange 40 that slideably engages a radial lip 22, fixedly mounted within the gas turbine engine, thereby forming the opposite end of the sealing relationship. A sealing relationship must necessarily be formed at the two ends of the male section 32 while the male section "floats" and absorbs dimensional variation within the gas turbine engine. Specifically, in the preferred embodiment shown in FIG. 1, within sealing structure 30, the male section 32 moves axially within the female section 34 to absorb changes in the location of the combustor outlet 14. The opposite end of male section 32 moves radially to absorb changes in the position of the first stage vane 20 of the turbine inlet.

While the unattached male section 32 of the floating fishmouth seal enables the sealing structure 30 to absorb dimensional variations, it is also subject to a tendency to vibrate during engine operation. This tendency to vibrate is further complicated by any leakage of air across the seal structure 30. Air leakage can cause the seal structure to become self-excited and reach a condition referred to as aeroelastic instability. When a condition of aeroelastic instability occurs, vibration amplitudes in the seal structure will dramatically increase, and the seal structure will vibrate excessively at its most responsive natural frequencies regardless of engine speed. Excessive vibration amplitudes caused by aeroelastic instability will weaken the components and lead to failure of the seal structure. When the seal fails, broken parts can be thrown into gas flowpath sections of the engine causing extensive and expensive damage. The high cost of repairs in complex turbine engines underscores the desirability of reducing vibration in the seal structure 30 by eliminating this air leakage-induced, self-excited vibration phenomena.

The purpose of the present invention is to eliminate this air leakage-induced, self-excited vibration of the floating fishmouth seal 30 during engine operation. This invention reduces the vibration in the fishmouth seal 30 caused by rotational loads during engine operation. A preferred form of the present invention is primarily comprised of two separate structures utilized to accomplish this function. The first structure is an annular array of leaf springs 60 that press against the radial flange 40 of the fishmouth seal to provide what is known as dry coulomb damping. Dry coulomb damping is the effect of frictional forces that resist continued vibrational movement because one dry surface is frictionally engaging another dry surface.

The second structure of the present invention, as shown in FIG. 2, is a sinusoidal-shaped annular support member 80, as viewed in axial cross section, that is attached to the female section 34 of the fishmouth seal to provide a closed-in structure. This sinusoidal-shaped annular supportmember increases the torsional rigidity of the section and thereby reduces the propensity of the female section 34 to vibrate. The effect of the two structures is to reduce vibration at both ends of the sealing relationship within the fishmouth seal and thereby increase the operational life of the seal structure.

The details of the first vibration-reducing structure comprising an annular array of leaf springs are shown in FIGS. 2 and 3. This first structure is comprised of a spring support structure 64 that provides a support platform to position the annular array of leaf springs 60. The spring support structure 64 is fixedly mounted in the engine axially adjacent the radial flange 40. In one embodiment of this invention, the spring support structue 64 is attached to a first vane support member 70 with bolts 72, as this provides a stable and appropriately located base of support. The spring support structure 64 includes a plurality of raised brackets 66 that are generally omega-shaped and are equally spaced in an annular arrangement on the first stage vane support member 70. The raised brackets 66, two of which are shown in FIG. 3, extend from the support member 70 in the direction of the radial flange 40 thus forming an appropriately positioned base for supporting the end portions of the leaf spring 60 adjacent the radial flange 40.

The ends of the leaf spring 60 are attached to the brackets 66 with a rivet 68 and a sleeve that is welded to the bracket 66 extending through slots cut in the end portions of the leaf springs 60. This type of attachment means allows the springs 60 to bend and slide after installation to ensure a simply supported structure. The ability to bend and slide assists the leaf springs in maintaining pressure on the radial flange in the course of any deflection of the flange, and additionally, allows the spring to undergo deflection without breaking. The support brackets 66 also provide a barrier for preventing excessive deflection of the springs 60 that might otherwise break the springs.

The leaf springs 60 are curved and form a convex surface facing the direction of the radial flange 40. The center of curvature of the convex surface of each leaf spring is provided with a raised section 69. These raised sections 69 directly contact the radial flange 40 over a square surface of the raised section 69 and press the flange 40 against the radial lip 22. The frictional interaction between the radial flange 40, the fixed radial lip 22, and the raised sections 69 during any movement of the radial flange 40, cauuses dry coulomb damping and reduces vibration in the sealing structure 30.

The second vibration-reducing structure is comprised of an annular sinusoidal-shaped support member 80, as shown in FIG. 2. This support member 80 provides a closed-in structure when attached to an outer, radially inwardly facing surface of the lower arm 39 of the female section 34. This closed-in structure adds torsional rigidity and increases the natural frequencies of the lower arm 39 thereby reducing its tendency to vibrate. To provide additional vibration-reducing means, the support member 80 is attached with braze 82 at one end and rivets 84 at the other end of the lower arm 39. This attachment means provides both dry coulomb damping at the rivet when the surface of the support member 80 frictionally engages the inner surfaces of the arms and structural stiffness by the employment of a closed-in section.

While both of the two vibration-reducing structures will operate independently in conjunction with a fishmouth seal in a gas turbine engine, the combined effect of the two structures is desirable to ensure that air leakage-induced vibration is eliminated at both ends of the sealing relationship. Elimination of air leakage-induced vibration at one end of the sealing relationship or in just the male section 32 or just the female section 34 could potentially lead to an isolated source of vibration in an unprotected section. This is particularly true of a floating fishmouth seal because of the tendency of the air to leak across either end of the male section which could cause a localized condition of aeroelastic instability. Therefore, it is desirable to have damping and stability at both ends of the male section 32 where the male section seals against the turbine section and also where the male section seals against the female section 34, as is accomplished in the present invention.

While the present invention has been discussed in a particular embodiment, it is clear that substantial modification of this embodiment may occur without departing from the concepts of the present invention. For example, while the invention has been described in conjunction with a floating fishmouth seal between a combustor outlet and a turbine nozzle inlet, it is contemplated that the invention can be successfully employed in conjunction with a floating fishmouth seal at other locations. As long as the conceptual characteristics of the invention are present, a departure from the invention as claimed has not taken place.

We claim:

1. In a gas turbine engine having a flexible annular gas seal comprising a female section with an upper annular arm and a lower annular arm, including inner and outer surfaces, said arms being in a gas sealing relationship at one end and diverging from said end to define an annular inlet therebetween; and a male section including an annular extension for insertion into said annular inlet in sealing relationship with at least one of said arms thereby forming one end of the annular seal and including a radial flange slideably engaging a radial lip fixed to said engine thereby forming a second end of the annular seal, an improvement for reducing vibration of said seal during engine operation, comprising:

(a) an annular spring support structure fixedly mounted within said engine axially adjacent said radial flange; and (b) an array of leaf springs positioned by said spring support structure to press said radial flange against said radial lip thereby providing dry coulomb damping to said seal.

2. The apparatus recited in claim 1 wherein said annular spring support structure comprises:

(a) raised brackets spaced around an annulus that is fixedly mounted within said engine, said raised brackets extending from said annulus in the direction of said radial flange thereby providing mounting locations for end portions of said leaf springs; and (b) attaching means for attaching the end portions of said leaf springs to said raised platforms.

3. The apparatus recited in claim 2 wherein each of said attachment means comprises a raised pin extending from each of said platforms through a slot in the end portion of each of said leaf springs thereby permitting relative linear movement of said leaf spring end portions in relation to said platform.

4. The apparatus recited in claim 3 wherein each of said leaf springs comprises a curved member having a convex face, wherein the convex face presses the radial flange of said male section against said radial lip thereby providing dry coulomb damping to said flexible seal.

5. The apparatus recited in claim 1 wherein the annular extension of said male section forms a sealing relationship with the inner surface of either said lower arm or said upper arm.

6. The apparatus recited in claims 1, 4, or 5, and further comprising an annular support member attached to the outer surface of said lower arm of said female section to define a closed-in structure for providing torsional rigidity and increasing natural frequencies of said lower arm.

7. The apparatus recited in claim 6 further comprising a riveted joint at one end of the annular support member for attaching the support member and to add frictional damping to the female section.

* * * * *